(12) United States Patent
Gelfand

(10) Patent No.: US 7,783,675 B2
(45) Date of Patent: Aug. 24, 2010

(54) DATA CELLS, AND A SYSTEM AND METHOD FOR ACCESSING DATA IN A DATA CELL

(76) Inventor: Boris Gelfand, 7986 Autumn Ridgeway, Chanhassen, MN (US) 55317

( * ) Notice: Subject to any disclaimer, the term of this patent is extended or adjusted under 35 U.S.C. 154(b) by 472 days.

(21) Appl. No.: 11/724,488

(22) Filed: Mar. 15, 2007

(65) Prior Publication Data

US 2007/0174313 A1   Jul. 26, 2007

Related U.S. Application Data

(63) Continuation of application No. 09/896,858, filed on Jun. 29, 2001, now Pat. No. 7,200,600.

(60) Provisional application No. 60/215,447, filed on Jun. 30, 2000.

(51) Int. Cl.
*G06F 17/30* (2006.01)
(52) U.S. Cl. ........................... 707/802; 707/803
(58) Field of Classification Search .................. 707/100, 707/103
See application file for complete search history.

(56) References Cited

U.S. PATENT DOCUMENTS

| | | | |
|---|---|---|---|
| 4,864,497 A | 9/1989 | Lowry et al. | |
| 5,371,675 A | 12/1994 | Greif et al. | |
| 5,598,519 A | 1/1997 | Narayanan | |
| 5,717,924 A | 2/1998 | Kawai | |
| 5,819,293 A | 10/1998 | Comer et al. | |
| 5,852,819 A | 12/1998 | Beller | |
| 5,893,087 A | 4/1999 | Wlaschin et al. | |
| 5,907,846 A | 5/1999 | Berner et al. | |
| 5,930,799 A | 7/1999 | Tamano et al. | |
| 5,933,634 A | 8/1999 | Enokido et al. | |
| 5,937,155 A | 8/1999 | Kennedy et al. | |

(Continued)

FOREIGN PATENT DOCUMENTS

JP    406/052139    2/1994

OTHER PUBLICATIONS

Hull, Richard et al., "Semantic Database Modeling: Survey, Applications and Research Issues", ACM Computing Surveys, vol. 19, No. 3, Sep. 1987, pp. 201-260.

(Continued)

*Primary Examiner*—Etienne P LeRoux
*Assistant Examiner*—Cindy Nguyen
(74) *Attorney, Agent, or Firm*—Beck + Tysver, P.L.L.C.

(57) ABSTRACT

A method and system is presented for storing data in data cells containing only a single element of data. Each data cell includes four components: an Entity Instance identifier ("O"), an Entity Type identifier ("E") an Attribute Type identifier ("A"), and an Attribute Value ("V"). Groups of cells with identical O and E values constitute a cell set. Every cell contains a unique combination of O, E, A, and V. Relationships between cell sets are established by creating two synapse cells. The first synapse cell has O and E values of the first cell set, and has A and V values equal to the E and O value, respectively, of the second cell. The second synapse cell has O and E values of the second cell, and has as its A and V values the E and O value, respectively, of the first cell.

16 Claims, 4 Drawing Sheets

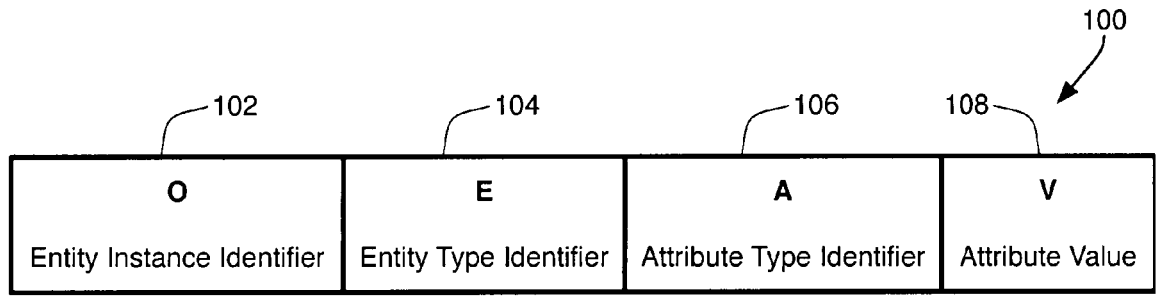

U.S. PATENT DOCUMENTS

| | | | |
|---|---|---|---|
| 5,960,437 | A | 9/1999 | Krawchuk et al. |
| 5,970,506 | A | 10/1999 | Kiyan et al. |
| 6,047,297 | A | 4/2000 | Johnson et al. |
| 6,070,165 | A | 5/2000 | Whitmore |
| 6,081,809 | A | 6/2000 | Kumagai et al. |
| 6,101,502 | A | 8/2000 | Keubner et al. |
| 6,122,641 | A | 9/2000 | Williamson et al. |
| 6,154,748 | A | 11/2000 | Gupta et al. |
| 6,195,651 | B1 | 2/2001 | Handel et al. |
| 6,208,992 | B1 | 3/2001 | Bruckner |
| 6,356,896 | B1 | 3/2002 | Cheng et al. |
| 6,397,206 | B1 | 5/2002 | Hill et al. |
| 6,421,658 | B1 | 7/2002 | Carey et al. |
| 6,438,562 | B1 | 8/2002 | Gupta et al. |
| 6,714,936 | B1 | 3/2004 | Nevin, III |
| 6,917,943 | B2 | 7/2005 | Butler |
| 7,076,494 | B1 * | 7/2006 | Baer et al. ............... 707/102 |

OTHER PUBLICATIONS

D.S. Batory, T.Y. Leung and T.E. Wise, Implementation Concepts for an Extensible Data Model and Data Language, ACM Transactions on Database Systems, vol. 13, No. 3, Sep. 1988, pp. 231-262.

Neils Nes, Architecture of Monet, Friday, Jul. 26 15:20:35 MET DST 1996, http://homepages.cwi.nl/~niels/Pub/image_retrieval/node4.html.

Shipman, David W., "The Functional Data Model and the Data Language DAPLEX", ACM Transaction on Database Systems, vol. 6, No. 1, Mar. 1981, pp. 140-173.

Tsurt, Shalom et al., "An Implementation of GEM—supporting a semantic data model on a relational back-end." ACM 1984, pp. 286-295.

Carey, Michael et al., "O-O, What Have They Done to DB2?" Proceedings of the 25th VLDB Conference, Edinburgh, Scotland, 1999, pp. 542-553.

Nixon, Brian et al., "Implementation of a Compiler for a Semantic Data Model: Experiences with Taxis", ACM 1987, pp. 118-131.

Mylopoulos, John et al., "A Perspective for Research on Conceptual Modelling", ACM 1980, pp. 167-170.

European Patent Office, Communication Pursuant to Article 94(3) EPC, Oct. 4, 2008.

* cited by examiner

*Figure 1 (Prior Art)*

| EMPLOYEE | | | |
|---|---|---|---|
| Employee Name | Social Security # | Address | Salary |
| Johnson | 100-10-1000 | Minneapolis | 50,000 |
| Anderson | 200-20-2000 | Milwaukee | |
| Rodriguez | 300-30-3000 | Cleveland | 30,000 |

*Figure 2 (Prior Art)*

| PROJECT | |
|---|---|
| Project Name | Project Size |
| Red | Large |
| Yellow | Medium |
| Green | Small |

*Figure 3 (Prior Art)*

| EMPLOYEE PROJECT | |
|---|---|
| Project Name | Employee Name |
| Red | Johnson |
| Red | Anderson |
| Yellow | Rodriguez |
| Green | Rodriguez |

Figure 4

| O | E | A | V |
|---|---|---|---|
| Entity Instance Identifier | Entity Type Identifier | Attribute Type Identifier | Attribute Value |

Figure 5

| O | E | A | V |
|---|---|---|---|
| Object ID | Employee | Salary | 50,000 |

Figure 6

| O | E | A | V |
|---|---|---|---|
| 1 | Employee | Employee Name | Johnson |
| 1 | Employee | Social Security | 100-10-1000 |
| 1 | Employee | Address | Minneapolis |
| 1 | Employee | Salary | 50,000 |
| 2 | Employee | Employee Name | Anderson |
| 2 | Employee | Social Security | 200-20-2000 |
| 2 | Employee | Address | Milwaukee |
| 3 | Employee | Employee Name | Rodriguez |
| 3 | Employee | Social Security | 300-30-3000 |
| 3 | Employee | Address | Cleveland |
| 3 | Employee | Salary | 30,000 |
| 20 | Project | Project Name | Red |
| 20 | Project | Size | Large |
| 21 | Project | Project Name | Yellow |
| 21 | Project | Size | Medium |
| 22 | Project | Project Name | Green |
| 22 | Project | Size | Small |

Figure 7

| O — 102 | E — 104 | A — 106 | V — 108 |
|---|---|---|---|
| 1 | Employee | First Name | Sue |
| 1 | Employee | Spouse | Joe |
| 1 | Employee | Title | President |

| O — 102 | E — 104 | A — 106 | V — 108 |
|---|---|---|---|
| 1 | Employee | Employee Name | Johnson |
| 20 | Project | Project Name | Red |
| 1 | Employee | Project | 20 |

| O — 102 | E — 104 | A — 106 | V — 108 |
|---|---|---|---|
| 1 | Employee | Employee Name | Johnson |
| 20 | Project | Project Name | Red |
| 20 | Project | Employee | 1 |

| O | E | A | V |
|---|---|---|---|
| 1 | Employee | Employee Name | Johnson |
|   |   |   |   |
| 22 | Project | Size | Small |
| 1 | Employee | Project | 20 |
| 2 | Employee | Project | 20 |
| 3 | Employee | Project | 21 |
| 3 | Employee | Project | 22 |
| 20 | Project | Employee | 1 |
| 20 | Project | Employee | 2 |
| 21 | Project | Employee | 3 |
| 22 | Project | Employee | 3 |

102 — O
104 — E
106 — A
108 — V
100
110

DATA CELLS, AND A SYSTEM AND METHOD FOR ACCESSING DATA IN A DATA CELL

CROSS-REFERENCE TO RELATED APPLICATIONS

This application is a continuation of U.S. patent application Ser. No. 09/896,858, filed Jun. 29, 2001, now U.S. Pat. No. 7,200,600, which claims the benefit of U.S. Provisional Application Ser. No. 60/215,447, filed on Jun. 30, 2000.

TECHNICAL FIELD

The present invention relates generally to database systems. More particularly, the present invention relates to a system and method for storing and accessing data in data cells.

BACKGROUND OF THE INVENTION

Current database technology generally relies on one of three main types: relational databases, object-oriented databases, or a combination of relational and object-oriented databases. Relational databases divide the world into tables, with columns defining data fields and rows defining data records. Relational databases then use relationships and set theory to model and manage real-world data. Object-oriented databases model the world in objects, in which data is encapsulated into objects and associated with methods and procedures. Object-relational databases are a combination of the previous two types.

All of these database constructs are primarily concerned with organizing data into predefined formats and structures. In order to represent the data, an object or a table must be defined with known data characteristics. For instance, before data can be stored in an object, the object must be defined to allow certain types of data, and the object must be pre-associated with relevant procedures. Alternatively, in the relational database construct, a table must be defined before any data can be stored in the table, with each column being defined to allow only certain amounts and types of data.

Unfortunately, this pre-defining of data is always done without a perfect knowledge of the real-world data being modeled. As a result, once the database is actually implemented, changes often must be made to the table definitions or objects so as to more accurately reflect the real-world data. These changes will typically require that the database be reconstructed according to the new definitions. In addition, even after an optimum definition of the real-word data is created, the existing database constructs are not flexible enough to handle unique situations that do not fit the optimum definition. Once this definition is created, along with the related data formats, relationships, and methods, the created structure cannot be easily modified to allow the representation of the unusual case.

What is needed is a database construct that is not as rigid as the existing models of relational and object-oriented databases. This preferred model would not require a pre-definition of the data, but would rather allow data to be entered as it is encountered. Associations between data elements could be developed on-the-fly, and new data could be added to the system even if the pre-existing model did not expect such data to exist.

SUMMARY OF THE INVENTION

The present invention meets the needs and overcomes the associated limitations of the prior art by storing data in cells. A data cell contains only a single element of data. By storing all data in these cells, data can be dynamically structured according to changing needs. In addition, the information stored in the cell is easily accessible, meaning that data extrapolation is quick and easy. Additional references to a particular data value will always use the one data value that has been dynamically normalized by the present invention. Finally, meta data that defines data structures and types are stored in data cells, which allows the data collection to be self-defining.

The data cell of the present invention includes four elements: an Entity Instance Identifier (identified in this application through the letter "O"), an Entity Type Identifier ("E"), an Attribute Type Identifier ("A"), and an Attribute Value ("V"). For instance, the existence of an employee who is named "Johnson" would be represented by a single cell. The Entity Type Identifier would be an "Employee." The Entity Instance Identifier is an identifier, such as the number "1," that allows the employee to be uniquely identified. The Attribute Type Identifier would be the "Employee Name," and the Attribute Value would be "Johnson." The data cell would look like the following:

| O | E | A | V |
|---|---|---|---|
| 1 | Employee | Employee Name | Johnson |

Groups of cells with identical O and E values constitute a cell set, and contain information about a specific instance of an entity. Every cell contains a unique combination of O, E, A, and V, meaning that each cell is unique within any particular information universe.

Relationships between cells and cell sets are created through the use of "linking" or "synapse" cells. Synapse cells are created through a process of transmutation. In transmutation, two cell sets are associated with each other through the creation of two synapse cells. The first synapse cell has the O and E values of the first cell set, and has an A and V value equal to the E and O value, respectively, of the second cell set. The second synapse cell has the O and E values of the second cell set, and has as its A and V values the E and O value, respectively, of the first cell set.

BRIEF DESCRIPTION OF THE DRAWINGS

FIG. 1 is a prior art database table showing a sample representation of employee data in a relational database system.

FIG. 2 is a prior art database table showing a sample representation of project data in a relational database system.

FIG. 3 is a prior art database table showing a sample representation of relationship data in a relational database system.

FIG. 4 is a schematic illustration of a cell of the present invention showing the four components of a data cell.

FIG. 5 shows an example data cell.

FIG. 6 is a cell listing of present invention data cells containing the data stored in the tables shown in FIGS. 1 and 2.

FIG. 7 is a cell listing showing three cells that can be added to the cell set list.

FIG. 8 is a schematic drawing showing the first stage of transmutation to create a synapse cell linking an employee cell set with a project cell set.

FIG. 9 is a schematic drawing showing the second stage of transmutation to create a second synapse cell linking a project cell set with an employee cell set.

FIG. 10 is a cell listing showing a portion of the data cells shown in FIG. 6 along with the synapse cells setting forth the relationships found in FIG. 3.

DETAILED DESCRIPTION OF THE INVENTION

1. Prior Art

FIGS. 1 through 3 show three relational tables as would be used in the prior art. The first table 10 shown in FIG. 1 contains employees. There are four columns in this table 10, namely employee name 12, social security number 14, address 16, and salary 18. These columns 12, 14, 16, and 18 define the different types of data that can be contained in table 10. Table 10 also contains three rows 20 of data. Each row 20 contains information about a different employee in the table 10. Data values for a relational data table such as table 10 are determined by finding the field that exists at the cross section between a particular row 20 and a particular column 12, 14, 16, or 18.

Similarly, the second table 40 shown in FIG. 2 contains information about projects that employees might work on for their employer. The projects table 40 shown in FIG. 2 contains only two columns, namely a project name column 42 and a project size column 44. The projects table 40 contains information about three projects, and therefore the table contains exactly three rows 46.

It is often important in databases to model the fact that some data is associated with other data. In the example of employees and projects, as shown in FIGS. 1 and 2, the database should show that certain employees work on certain projects. If only one employee can be assigned to a project, it would be possible to associate an employee with a project simply by adding an employee column to the project table 40. Similarly, if each employee were assigned only to a single project, a project column in the employee table 10 would serve to make the association.

However, in the real world, it is likely that each project will have more than one employee assigned to it, and it is likely that each employee will be assigned to more than one project. To handle the possibility of these types of many-to-many relationships, it is necessary to utilize a third table 60, such as that shown in FIG. 3. This third table 60 contains only two columns, namely project name 62 and employee name 64. The project name column 62 contains the same type of information as the project name column 42 in table 40. Likewise, employee name column 64 contains the same information as employee name column 12 of table 10. Each row 66 represents a relationship between a row 20 in table 10 (i.e., an employee) and a row 46 in table 40 (i.e., a project). Thus, table 60 shows that the Red project has two employees working on it, namely Johnson and Anderson, while the Yellow and Green projects have only a single employee assigned to them, namely Rodriguez.

Very often, relational databases utilize key fields to aid in data access. The data in a key field must be unique for the entire table. Thus, a key field for the employee table 10 might be the social security number column, since the U.S. government strives to ensure that each social security number is unique to one individual. In project table 40, it might be wise to create a project number column that is subject to a uniqueness constraint to ensure that no two rows 46 contain the same project number. The key fields are then pre-indexed, which allows fast access to data in a table when the key field is known. These key fields can then be used to create efficient relationships in a table such as table 60.

2. Data Cells

The present invention differs from traditional relational and object-oriented databases in that all data is stored in data cells 100. In its most generic sense, a data cell 100 is a data construct that contains a single attribute value. In comparison to a relational database table, a single data cell would contain the value of a field found at a single column and row intersection. The data cell 100 of the present invention differs from an intersection in a data table in that the data cell 100 is not stored within a table or an object construct. Because there is no external construct to associate one cell 100 with another, each data cell 100 of the present invention must be self-identifying. In other words, the data cell 100 must contain not only the value of interest, but it also must contain enough information to identify the attribute to which the value relates, and to associate the attribute with a particular instance of an entity.

As shown in FIG. 4, the preferred embodiment of a data cell 100 utilizes four fields: an Entity Instance Identifier 102, an Entity Type Identifier 104, an Attribute Type Identifier 106, and an Attribute Value 108. These four fields 102, 104, 106, and 108 are also identified by the one letter titles "O," "E," "A," and "V," respectively.

The O field 102 is the Entity Instance Identifier, and serves to uniquely identify the entity that is associated with the data cell 100. The E field 104 is the Entity Type Identifier, which identifies the type of entity associated with the cell 100. The O field 102 and the E field 104 together uniquely identify an entity in an information universe. An information or data universe is defined as the complete collection of data cells 100 that exist together. All cells 100 with the same O field 102 and E field 104 within an information universe are considered part of the same cell set 101. All cells 100 within a cell set 101 are used to store data and relationships about the particular entity instance identified by the combination of the O and E fields 102, 104.

The A or Attribute Type Identifier field 106 indicates the type of information found in the cell 100. Finally, the V or Attribute Value field 108 contains the actual real-world information that is found in the cell 100. The data in V 108 can be of any type, including a character string, a number, a picture, a short movie clip, a voice print, an external pointer, an executable, or any other type of data.

Each cell 100 contains one unit or element of information, such as the fact that a particular employee makes $50,000 per year. The data cell 100 that contains this information might look like that shown in FIG. 5. The O field 102 contains the phrase "Object ID," which indicates that the O field 102 contains some type of identifier to uniquely identify the employee that has this salary. In the preferred embodiment, the object identifiers in the O field 102 are integers. The E field 104 of FIG. 5 indicates that the type of entity that this cell 100 applies to is an employee. The A field 106 shows that this cell 100 describes the salary attribute. Finally, the V field 108 contains the actual, real-world data for the cell 100, namely the $50,000 salary.

FIG. 6 shows the data found in FIGS. 1 and 2 in the form of data cells 100 of the current invention. For each employee in table 10, the four columns 12, 14, 16, and 18 of data are embodied in four separate data cells 100. The data for the employee named Johnson are found in the first four data cells 100 in FIG. 6. Since these first four data cells 100 all contain the same O and E values, these cells 100 form a cell set 101. More specifically, the O field 102 and E field 104 indicate that this first cell set 101 contains information about instance number "1" of an entity of type "Employee." The A fields 106 of these four cells 100 represent the four attributes for which data has been stored, namely Employee Name, Social Security, Address, and Salary. The V fields 108 holds the actual values for these attributes.

An examination of FIGS. 1, 2, and 6 reveals that all of the information stored in tables 10 and 40 has been replicated in individual data cells 100 of FIG. 6. In FIG. 1, the employee Anderson has no salary value in column 18. Thus, the second cell set 101 in FIG. 6 contains only three cells 100, since no cell 100 is needed to represent that fact that no information is known about Anderson's salary. This differs from relational database table of FIG. 1, where each column 12, 14, 16, and 18 must exist for all employee rows 20, even in cases where no value exists and the field simply sits empty.

Moreover, this flexibility makes it possible to have additional cells 100 for some cell sets 101 that do not exist in other cell sets 101. FIG. 7 shows three possible additional cells 100 that relate to the employee named "Johnson." With the flexibility of the cell-based data structure of the present invention, it is possible to add cells 100 such as those shown in FIG. 7 on the fly. There is no need to restructure the database to allow such new information, as would be required if new information were to be tracked in a prior art relational or object oriented database.

3. Transmutation

As shown in FIG. 3, an association between the employee named Johnson and the project named Red is created in a relational database by creating a row 66 in a relationship table 60. An association between cells 100 and/or cell sets 101 can also be created in the cell-based data structure of the present invention. This is accomplished through the use of special types of cells known as synapse cells 110.

Synapse cells 110 are created through a process known as transmutation, which is illustrated in FIGS. 8 and 9. FIG. 8 shows two conventional cells 100, the first belonging to the cell set 101 relating to the employee named Johnson, and the second belonging to the cell set 101 relating to the Red project. The synapse cell 110 that establishes an association between these two cell sets 101 is created by making a new synapse cell 110 based upon the values of cells 100 from the two cell sets 101. The new synapse cell is given the same O 102 and E 104 values of the first cell set 101, in this case the values "1" and "Employee." The A 106 and the V 108 values of the synapse cell 110 are taken from the E 104 and the O 102 values, respectively, of the second cell 100. This "transmutation" of the existing cells 100 into a new synapse cell 110 is represented in FIG. 8 by four arrows.

The association of the two cell sets 101 is not complete, however, with the creation of a single synapse cell 110. This is because every association created in the present invention is preferably a two-way association, and therefore requires the creation of a second synapse cell, as shown in FIG. 9. This second synapse cell 110 is created using the same O 102 and E 104 values as that of the second cell 100. The A 106 and the V 108 values of this second synapse cell 110 are taken from the E 104 and the O 102 values, respectively, of the first cell 100 being associated. The transmutation into the second synapse cell 110 is shown by the arrows in FIG. 9.

When the two synapse cells 110 shown in FIGS. 8 and 9 have been created, then the association between the cell sets 101 has been completed. FIG. 10 shows the cell listing of FIG. 6, with the first and last cells 100 of FIG. 6 surrounding vertical ellipses that represent all of the other cells 100 of FIG. 6. In addition to the cells 100 of FIG. 6, the cell listing of FIG. 10 includes the synapse cells 110 that are needed to represent the relationships shown in table 60 of FIG. 3. It is clear that each synapse cell 110 has a partner synapse cell 110 that shows the same association in the opposite direction. Thus, eight synapse cells are used to represent the four relationships shown in table 60 of FIG. 3.

The synapse cells 110 are generally treated the same as other cells 100 that exist in a data universe. Occasionally, it is useful to be able to know whether a particular cell 100 contains actual data, or is a synapse cell 110. In the present invention, this is accomplished by associating a value, bitmap, or other flagging device with each cell 100 in the data universe. By examining this value, it would be possible for a database management system to immediately determine whether the cell 100 is a synapse cell 110 or contains real-world data.

The terms synapse and cell are used in this description to allude to the similarity between the present invention and the way that the human brain is believed to store memories. When the brain encounters new data, the data is stored in the brain's memory cells. The brain does not predefine the data into tables or objects, but rather simply accepts all data "on-the-fly" and puts it together later.

Research has shown that the synapses in the brain hook cells together. Where synapse pathways are more frequently traversed in the brain, those pathways become thicker or are connected with more synapses. As a result, these connections become stronger. At the same time, other connections can be formed in the brain that can be loose or incorrect. Yet these memory errors to not corrupt the database of the brain. Rather, the brain is constantly checking associations for validity, and correcting those associations as needed.

This is similar to the present invention. Data is encountered and placed into data cells 100. There is no need to predefine tables or objects before a new source of data is encountered. New cells 100 are simply created as needed. Synapse cells 101 can be formed between those data cells 100 on the fly. The associations that are represented by these synapse cells 101 can be strong or week, and be broken as needed without altering the structure of the database.

4. Conclusion

The above description provides an illustrative version of the present invention. It should be clear that many modifications to the invention may be made without departing from its scope. For instance, it would be possible to include only some of the elements of the present invention without exceeding the essence of the present invention. Therefore, the scope of the present invention is to be limited only by the following claims.

What is claimed is:

1. A computer readable storage media comprising
   a) a plurality of data cells, each cell having an instance identifier, an entity type identifier, an attribute type identifier, and an attribute value;
   b) a first subset of the data cells containing real data about specific instances of specific entity types; and
   c) a second subset of the data cells containing meta data about the first subset of data cells, the meta data including associations between members of the first subset of data cells;
   wherein the storage media has no construct external to the data cells that associates one data cell with another data cell.

2. The computer readable storage media of claim 1, wherein each of the data cells has a flagging mechanism to indicate whether the cell is part of the second subset.

3. The computer readable storage media of claim 1, wherein the first subset of data cells further comprises:

i) a first group of data cells containing attribute values for a first instance of a first entity type, including attribute values for at least a first and second attribute type; and ii) a second group of data cells containing attribute values for a second instance of the first entity type, including attribute values for at least the first and second attribute type.

4. The computer readable storage media of claim 3, wherein the first subset of data cells further comprises:

iii) a third group of data cells containing attribute values for a specific instance of a second entity type.

5. The computer readable storage media of claim 4, wherein the second subset of data cells further comprises a first linking cell linking the first group of data cells to the third group of data cells.

6. The computer readable storage media of claim 4, wherein all cells within any of the first, second, or third group of data cells have the same entity type identifier and the same instance identifier, further wherein the first and second groups each have the same entity type but a different instance identifier, and further wherein the third group has a different entity type than that of the first and second group.

7. The computer readable storage media of claim 6, wherein the second subset of data cells further comprises a first linking cell linking the first group of data cells to the third group of data cells, the first linking cell having:

i) an entity type equal to the entity type of the first group of cells;

ii) an instance identifier equal to the instance identifier of the first group of data cells;

iii) an attribute type equal to the entity type of the third group of data cells; and iv) an attribute value equal to the instance identifier of the third group of data cells.

8. The computer readable storage media of claim 7, wherein the second subset of data cells further comprises a second linking cell linking the third group of data cells to the first group of data cells, the second linking cell having:

i) an entity type equal to the entity type of the third group of cells;

ii) an instance identifier equal to the instance identifier of the third group of data cells;

iii) an attribute type equal to the entity type of the first group of data cells; and iv) an attribute value equal to the instance identifier of the first group of data cells.

9. The computer readable storage media of claim 7, wherein each of the data cells has a flagging mechanism to indicate whether the cell is a linking cell.

10. The computer readable storage media of claim 9, wherein the flagging mechanism is a bit value.

11. A method of establishing an association between data stored on a computer readable storage media comprising:

a) creating on the computer readable storage media a first, second, and third data cell, each of which contains
i) entity instance identifying information, and
ii) an attribute value for the entity instance;

b) storing data on the computer readable storage media in the first and second data cells;

c) creating an association between the first and second data cells within the third data cell by:

i) storing on the computer readable storage media the entity instance identifying information of the first data cell as the entity instance identifying information of the third data cell; and ii) storing on the computer readable storage media the entity instance identifying information of the second data cell as the attribute value for the third data cell.

12. The method of claim 11, wherein the first, second, and third data cells further contain entity type information, and wherein the step of creating an association further comprising the substep of:

iii) storing on the computer readable storage media the entity type information of the first data cell as the entity type information of the third data cell.

13. The method of claim 12, wherein the first, second, and third data cells further contain attribute type information, and wherein the step of creating an association further comprising the substep of:

iv) storing on the computer readable storage media the entity type information of the second data cell as the attribute type information of the third data cell.

14. The method of claim 11, further comprising the steps of:

d) creating a fourth data cell on the computer readable storage media formatted in the same way as the first, second, and third data cell;

e) storing on the computer readable storage media the entity instance identifying information found in the second data cell as the entity instance identifying information of the fourth data cell, and f) storing on the computer readable storage media the entity instance identifying information of the first data cell as the attribute value for the fourth data cell.

15. The method of claim 14, wherein the first, second, third, and fourth data cells further contain entity type information, and further comprising the step of:

g) storing on the computer readable storage media the entity type information of the first data cell as the entity type information of the third data cell; and h) storing on the computer readable storage media the entity type information of the second data cell as the entity type information of the fourth data cell.

16. The method of claim 15, wherein the first, second, third, and fourth data cells further contain attribute type information, and further comprising the step of:

i) storing on the computer readable storage media the entity type information of the second data cell as the attribute type information of the third data cell; and j) storing on the computer readable storage media the entity type information of the first data cell as the attribute type information of the fourth data cell.

* * * * *